(12) United States Patent
Gardes

(10) Patent No.: US 7,843,591 B2
(45) Date of Patent: Nov. 30, 2010

(54) DIGITAL TRACING DEVICE FOR DIGITIZING AND DISPLAYING A DOCUMENT

(75) Inventor: Joël Gardes, Grenoble (FR)

(73) Assignee: France Telecom, Paris (FR)

( * ) Notice: Subject to any disclaimer, the term of this patent is extended or adjusted under 35 U.S.C. 154(b) by 173 days.

(21) Appl. No.: 11/922,370

(22) PCT Filed: Jun. 12, 2006

(86) PCT No.: PCT/FR2006/050545

§ 371 (c)(1),
(2), (4) Date: Dec. 13, 2007

(87) PCT Pub. No.: WO2006/134296

PCT Pub. Date: Dec. 21, 2006

(65) Prior Publication Data

US 2009/0135454 A1      May 28, 2009

(30) Foreign Application Priority Data

Jun. 13, 2005  (FR) .................................. 05 05955

(51) Int. Cl.
| | |
|---|---|
| G06F 3/12 | (2006.01) |
| G06F 3/041 | (2006.01) |
| H04N 1/00 | (2006.01) |
| H04N 1/04 | (2006.01) |
| G09G 3/36 | (2006.01) |
| G06K 9/00 | (2006.01) |

(52) U.S. Cl. ...................... 358/1.15; 358/400; 358/401; 358/473; 358/474; 345/104; 345/173; 382/187

(58) Field of Classification Search ............... 358/1.15, 358/400, 471, 473, 482, 513, 474, 401; 345/87, 345/44, 104, 619, 173, 179, 180, 667, 660, 345/661; 382/187, 179, 101, 119, 137, 186, 382/181, 202
See application file for complete search history.

(56) References Cited

U.S. PATENT DOCUMENTS

| | | | |
|---|---|---|---|
| 5,920,401 A | 7/1999 | Street et al. | |
| 6,396,598 B1 * | 5/2002 | Kashiwagi et al. | .......... 358/474 |
| 6,972,862 B2 * | 12/2005 | Tang et al. | .................. 358/1.15 |
| 2002/0079512 A1 | 6/2002 | Yamakazi et al. | |
| 2004/0245438 A1 | 12/2004 | Payne et al. | |

FOREIGN PATENT DOCUMENTS

EP           0698992 A         2/1996

OTHER PUBLICATIONS

T. Someya et al., "A large-area, flexible, and lightweight sheet image scanner integrated with organic field-effect transistors and organic photodiodes", Electron Devices Meeting, 2004, IEDM Technical Digest, IEEE International, San Francisco, CA, Dec. 13-15, 2004.

* cited by examiner

*Primary Examiner*—Charlotte M Baker
(74) *Attorney, Agent, or Firm*—Cohen Pontani Lieberman & Pavane LLP

(57) ABSTRACT

A digital tracing method and device, comprising a flat acquisition element (3) for digitizing a document (7) and a flat display element (5) for displaying said digitized document mounted on said flat acquisition element (3).

10 Claims, 3 Drawing Sheets

DIGITAL TRACING DEVICE FOR DIGITIZING AND DISPLAYING A DOCUMENT

RELATED APPLICATIONS

This is a U.S. National Phase Application under 35 USC 371 of International Application No. PCT/FR2006/050545, filed on 12 Jun. 2006.

This patent application claims priority of French patent application No. 0505955 filed 13 Jun. 2005, the disclosure content of which is hereby incorporated by reference.

BACKGROUND OF THE INVENTION

The invention concerns a digital tracing device and more particularly a portable document capture device.

Digital documents have become one of the main ways of communicating information, whether in a highly-structured form (for example XML, HTML, Word), a weakly structured form (PDF), or an unstructured form (for example an image of a digitized document).

At present, the best way to digitize a document is to use a scanner. However, scanners are not suitable for digitizing large documents and/or documents that cannot be transported.

One possibility is to use a camera, a digital camera or a mobile terminal (mobile telephone, personal digital assistant) equipped with a digital camera. However, that kind of device is clearly subject to problems regarding imaging conditions, in particular framing the document, and those problems can be insurmountable for a user. Moreover, those digital image capture devices have yet to reach a level of performance in terms of resolution that is compatible with recognition of the content of a digitized document.

Moreover, mobile terminals have small screens limiting the possibility of reading documents to media of small size, often smaller than the A6 format.

OBJECT AND SUMMARY OF THE INVENTION

An object of the invention is to alleviate the above drawbacks and to provide a digital tracing device comprising a flat acquisition element adapted to digitize a document and a flat display element mounted on said flat acquisition element and adapted to display said digitized document.

Because the above lightweight digital tracing device can be pressed directly onto the document to be digitized it can capture a document under very varied conditions without framing problems. Moreover, it enables direct, local and instantaneous display of a digitized document for immediate verification of digitization quality.

According to a feature of the present invention the flat display element includes illumination means adapted to emit digitization light for activating digitization of said document by the flat acquisition element.

Thus it is not necessary for the acquisition element to have its own illumination system, further reducing the weight of the device.

Said flat acquisition element advantageously digitizes the document on which it is placed.

Thus the digital tracing device can easily digitize a large or non-transportable document.

The device further includes a data processor element coupled to said flat display element and said flat acquisition element.

Thus the device can be managed autonomously and locally.

According to a feature of the invention, the device further includes a flat interaction element mounted on said flat display element and coupled to a data processor element.

The resulting device combines the functions of digital acquisition of a document, display of the digitized document, and interaction with the content of the displayed document in order to annotate it, recognize it, and where applicable correct it.

What is more, this device combining capture of information and display of digital documents can have a display area much larger than any portable personal digital assistant or mobile telephone type terminal.

Said flat interaction element is advantageously transparent and advantageously covers at least a portion of said flat display element displaying the digitized document.

This offers users a context of use approximating to natural reading/writing when using pen and paper.

According to a feature of the present invention the data processor element is adapted to interact with at least a portion of a digitized document or a document to be digitized.

This offers a wide range of interactions with the document.

The flat acquisition element, the flat display element, and the flat interaction element are advantageously all flexible.

By means of its elasticity, the digital tracing device can be pressed against a document, fitting closely around any curves thereof, and can capture the document under good conditions. Furthermore, when pressed against a rounded document, it eliminates the distortion caused by the curvature effect, and thus enables digital acquisition to be of good quality, in contrast to a flatbed scanner or a digital camera. In fact, a conventional scanner is not suitable for digitizing documents that are not flat or documents that are not transportable and the curvature effect of a document having a rounded shape also degrades the quality of digital acquisition using a digital camera.

According to another feature of the present invention the data processor element is flexible.

Thus a device that is entirely flexible can be stored in a compact manner.

The device advantageously further includes a connection interface enabling it to communicate with an external terminal directly and/or via a telecommunications network.

The invention also consists in a digital tracing method comprising the following steps:
  placing a flat acquisition element relative to a document to be digitized;
  digitizing said document by means of the flat acquisition element;
  displaying the digitized document on a flat display element mounted on the flat acquisition element.

Thus the method traces a source document digitally under very varied conditions without framing problems.

The digitization step advantageously includes emission of digitization light by said flat display element.

According to a feature of the invention the flat and flexible acquisition element and the flat and flexible display element are placed on a document to be digitized having a non-flat surface.

The method further includes a step of interaction via a flat interaction element with a digitized document or a document to be digitized.

The invention also consists in a method of fabricating a digital tracing device including mounting a flat display element on a flat acquisition element so that a document digitized by the flat acquisition element is displayed on the flat display element.

The fabrication method further includes mounting a flat interaction element on at least a portion of the flat display element.

The method advantageously further includes coupling a data processor element to the flat acquisition element and/or the flat display element and/or the flat interaction element, said data processor element including a computer program including instructions for interaction of the flat display element or the flat interaction element with the flat acquisition element or the flat display element, respectively.

The invention further consists in a computer program executed in a data processor element and including instructions necessary for effecting one or more of the above digitization, display, illumination, and interaction steps.

BRIEF DESCRIPTION OF THE DRAWINGS

Other features and advantages of the invention emerge on reading the following description, given by way of non-limiting example and with reference to the appended drawings, in which.

DETAILED DESCRIPTION OF EMBODIMENTS

Figure 1:
FIG. 1 is a diagrammatic view of a digital tracing device in accordance with the invention including flexible flat acquisition and display elements.
Figure 2:
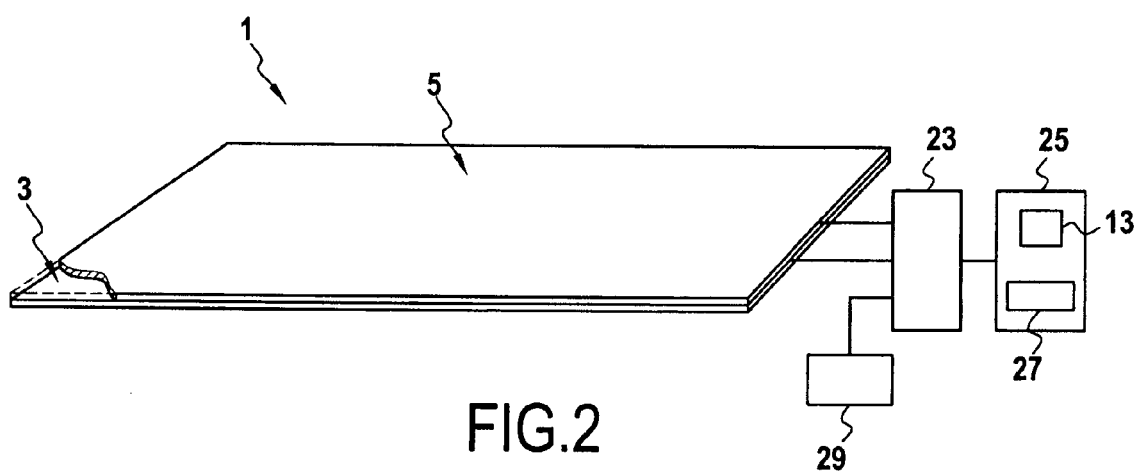
FIG. 2 is a diagrammatic view showing in more detail the digital tracing device from FIG. 1.

FIGS. 1 and 2 show in a highly diagrammatic form a digital tracing device 1 of the invention comprising a flat acquisition element 3 and a flat display element 5 mounted on the flat acquisition element 3. The flat acquisition element 3 is adapted to digitize a document 7 when placed directly on the document 7. Thus the flat acquisition element digitizes documents on which it is placed. Moreover, the flat display element 5 is adapted to display a document digitized by the flat acquisition element 3.

Of course, the flat acquisition element 3 can be placed on a transparent surface allowing the document 7 to be read. For example, the document 7 might be protected by a plastic film or enclosed in a box with a transparent upper face.

The flat acquisition element 3 is sensitive to light and so digitization can be effected by ambient light, a moving light, or any other lighting means.

For example, the flat acquisition element 3 is formed of a photosensitive electronic film. This kind of digitization film is known and was shown at the IEEE International Electron Devices Meeting (IEDM), San Francisco, USA, December 2004, for example.

Figure 3A:
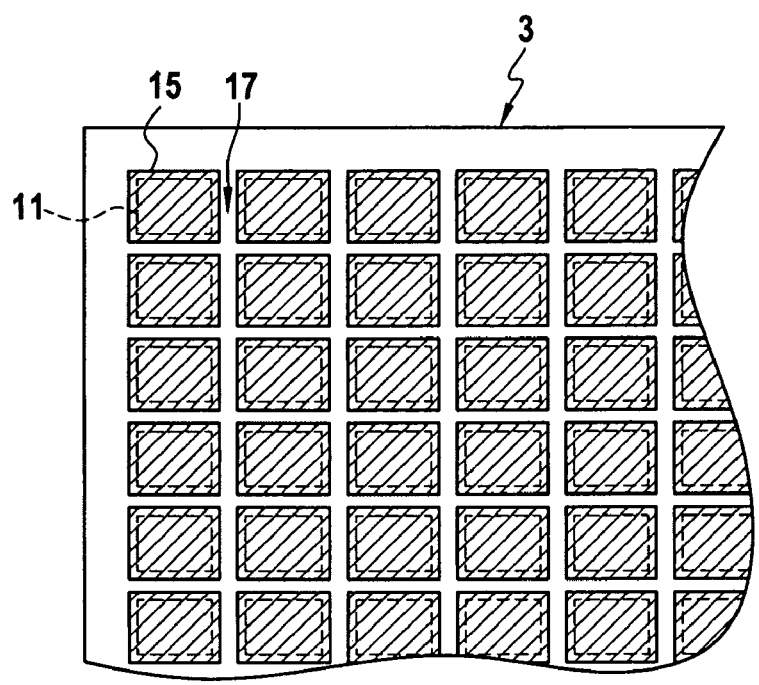
FIGS. 3A and 3B are diagrammatic views showing two variants of the flexible flat acquisition element from FIG. 2.

FIG. 3A shows that a first embodiment of the flat acquisition element 3 can comprise an acquisition matrix, made up of photodiode 11, e.g. of organic type. A matrix of organic photodiodes can be a polymer matrix including thousands of photodiodes 11 so that each photodiode 11 produces a current as a function of the light that is reflected by the document 7 and absorbed by the photodiodes 11. The currents produced by the photodiodes 11 can be stored in a memory 13 as a digital image of the document 7.

The flat acquisition element 3 is advantageously transparent to light from certain predetermined light sources. This transparency can provide for two different actions. A first action is viewing the document to be digitized through the flat acquisition element 3. A second action is activation of digitization by the flat acquisition element 3 using at least one of these predetermined light sources. Thus the photodiodes 11 of the flat acquisition element 3 can capture light rays reflected by the document 7.

Note that each photodiode 11 is covered by an opaque screen 15 on the side of the interface between the flat acquisition element 3 and the flat display element 5. Thus the photodiodes respond only to light rays reflected by the document 7 and not to direct light generated by the flat display element 5. Each opaque screen 15 associated with each photodiode 11 can advantageously correspond to an organic transistor 15 coupled to that photodiode 11 so that the current produced by the photodiode 11 is stored in the form of an electrical charge in the corresponding transistor 15. The flat acquisition element 3 can then be formed by two electronic films, one including the matrix of photodiodes 11 and the other including the corresponding matrix of transistors 15, together with the necessary electrical connections between the two films.

Of course, the opaque screens or transistors 15 which optically isolate one side of the photodiodes 11 do not cover the entire area of the flat acquisition element 3 and they leave transparent areas or channels 17 to allow light to pass to illuminate the document 7 to be digitized.

Thus the flat acquisition element 3 plays a role similar to a scanner for digitizing a document. Moreover, its transparency enables digitization to be performed with certain predetermined light sources.

Figure 3B:
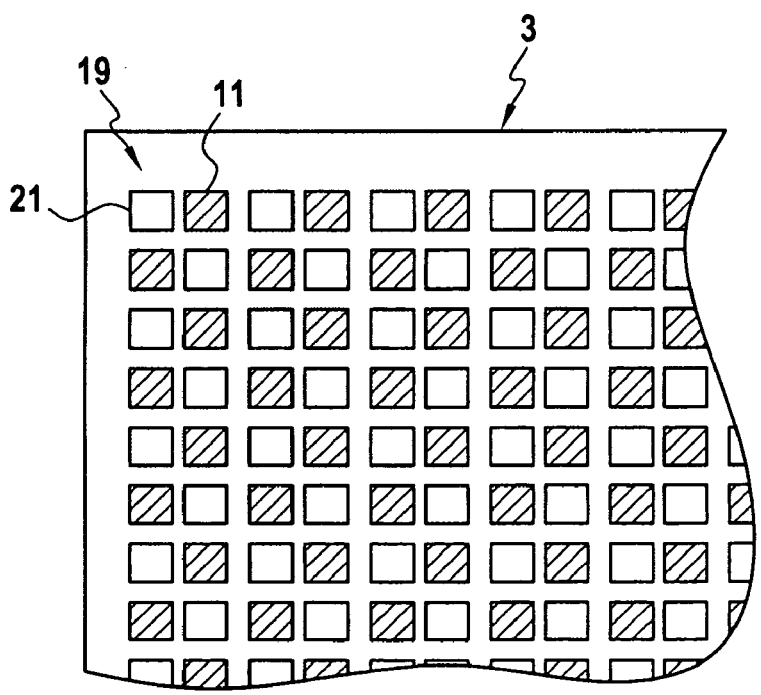

Alternatively, FIG. 3B shows a flat acquisition element 3 including a matrix of organic digitization units 19 each of which includes a photodiode 11 and a corresponding light-emitting diode 21. Thus the light-emitting diodes 21 illuminate the document 7 to be digitized and the photodiodes 11 absorb light reflected by the document 7. It is then not necessary for the flat acquisition element 3 to be transparent.

The flat display element 5 can be an electronic film including a display matrix that can include pixels, for example of organic type (not shown) using TFT technology, for example. Such flexible screens are well known and manufactured by the suppliers SAMSUNG and PHILIPS, among others.

Where applicable, the flat display element 5 can include liquid crystals or particles of different colors (for example black and white) and different charges or microbeads divided into two hemispheres of different color that react to an electric field.

The flat display element 5 advantageously includes lighting means (not shown) for emitting light referred to as digitization light for activating digitization of the document 7 by the flat acquisition element 3. Of course, the lighting means can consist of the display matrix itself.

Thus the display matrix of the flat display element 5 displays the digitized document and where applicable illuminates the document 7 for it to be digitized by the transparent flat acquisition element 3 (see FIG. 3A), before displaying the digitized document.

In fact, the transparency of the flexible flat acquisition element 3 enables digitization with the light emitted by the flat display element 5 and it is not necessary for the acquisition element 3 to have its own lighting system, further reducing the weight of the device.

This flat display element 5 is stuck to the flat acquisition element 3, for example, to form a digital tracing device 1. Where applicable, the flat display element 5 and the flat acquisition element 3 can be stuck to opposite faces of a transparent element, for example a flexible film.

The flat display element 5 and the flat acquisition element 3 are coupled by an input-output port 23 to a data processor element 25 including the memory 13 and a central unit 27 for controlling the digitization of the document 7 and the display of the digitized document, for example. Of course, the data processor element 25 can control the display of any other digital document received by the digital tracing device 1 from an external terminal.

In fact the digital tracing device 1 can include a connection interface 29 connected to the input-output port 23 so that the digital tracing device 1 can be connected by cable, radio or electromagnetic means to a personal digital assistant, computer, or mobile telephone type external terminal (not shown). This enables the digital tracing device 1 to dialogue with that terminal and/or to use a data processor element 25 of minimum calculation power.

Moreover, note that the connection interface 29 enables the digital tracing device 1 to communicate with the terminal directly and/or via a telecommunications network.

It is also possible to envisage coupling one or more elements (for example photodiodes) of the acquisition matrix of the flat acquisition element 3 to one or more elements of the display matrix of the flat display element 5 via electrical connections or elements for transforming the signal supplied by the elements of the acquisition matrix into excitation signals for the elements of the display matrix. These transformation elements can take the form of a matrix placed between the flat acquisition element 3 and the flat display element 5.

Where applicable, the flat acquisition element 3 and the flat display element 5 are flexible so that this combination can be pressed against a document 7 of rounded shape.

Figure 4:
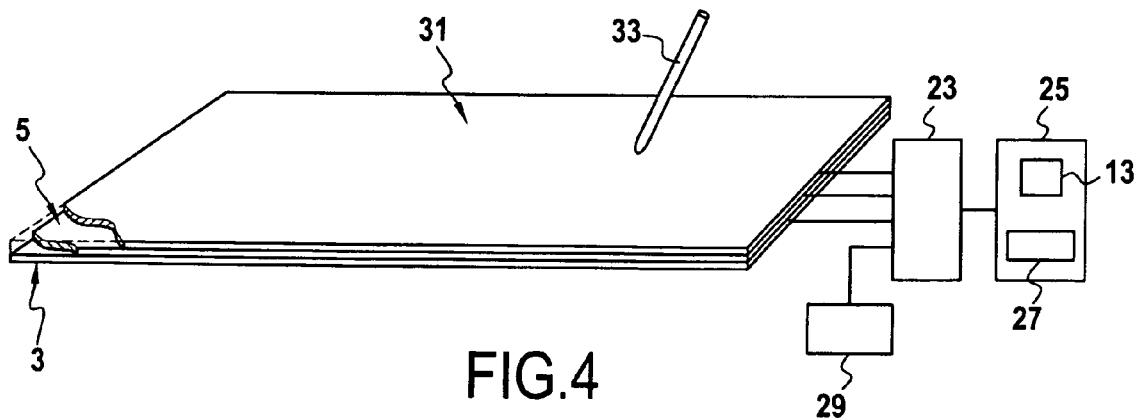
FIG. 4 is a diagrammatic view of a digital tracing device of the invention and including flexible flat acquisition, display, and capture elements.

FIG. 4 shows in a highly diagrammatic form a digital tracing device 1 that differs from the device shown in FIG. 2 in that it further includes a transparent flat interaction element 31 mounted on and stuck to the flat display element 5. As before, the flat interaction element 31 and the flat display element 5 can be stuck to opposite sides of a transparent film, possibly with further transparent elements (for example connection elements) introduced between the flat interaction element 31 and the flat display element 5.

Moreover, this flat interaction element 31 can cover all or part of the flat display element 5, and in particular it can cover all or part of the area of the flat display element 5 in which the digitized document is displayed, thus enabling a user to interact with the digitized document as with a paper document. Thus a user can highlight or annotate a digitized document directly, for example, or strike out certain elements of the digitized document.

For example, this transparent flat interaction element 31 can enable the user to interact with the flat acquisition element 3 or the flat display element 5 in a voice mode by means of a voice interface and/or in a capture mode using a touch-sensitive interface.

Thus the user can speak a voice command such as "Digitize" and then, on a touch-screen, frame an area of a document to be digitized (using a finger or, for more precision, an element having a pointed tip, such as a pencil or a stylus 33). The data processor element 25 then initiates capture of this area of the document 7 by the flat acquisition element 3, the illumination means of the flat display element 5 illuminating this area, where applicable.

A different embodiment of the flat transparent interaction element 31 can have keys on at least a portion of the flat interaction element 31. Thus one of these keys can be pressed to switch from an annotation capture mode to a digitization capture mode or to a shape recognition mode and a touch-screen used to add comments, specify an area of a document to be digitized or specify a portion of a document to be digitized (or a document that has already been digitized) to which shape recognition is to be applied.

Note that the touch-sensitive interface of the flat transparent interaction element 31 includes contact-sensitive means enabling the user to enter data or commands or to interact with the digitized document displayed, for example using the stylus 33. This kind of touch-screen is well known and is manufactured by the suppliers E-INK, TOPPAN PRINTING, and XEROX, among others.

Thus the contact-sensitive means can be equipped with means for capturing a moving trace and translating it into electronic ink form. This trace coded by the electronic ink includes spatial information of the trace (coordinates, lifting of the stylus) as well as temporal information of the movements of the trace (speed and/or acceleration, depending on the format specifications of the electronic ink).

Thus the touch-sensitive interface of the flat transparent capture element 31 can be formed of a thin film including microcapsules disposed between two transparent electrodes. Each microcapsule contains differently charged black and white pigments floating in a clear fluid, which pigments are moved between the two electrodes by an electric field generated in response to interaction gestures made by the user, for example using the stylus 33.

As before, the flat acquisition element 3, the flat display element 5, and the flat capture element 31 can be coupled via the input-output port 23 to the data processor element 25. This data processor element 25 can be mounted at one end of the various flexible elements 3, 5 and 31.

Likewise, the digital tracing device 1 can be connected to an external terminal via the connection interface 29 connected to the input-output port 23.

The flat acquisition element 3, the flat display element 5, and the flat interaction element 31 are all advantageously sufficiently transparent for the user to be able see through the device 1 in order to digitize documents in a more or less clear way, for example depending on the color or contrast.

Furthermore, the flat interaction element 31 can be positioned so as to cover all or part the acquisition area of the flat acquisition element 3, thus enabling the user to interact with the document 7 to be digitized. Thus the user can indicate parts to be digitized by framing them, where applicable with an indication of an enlargement or reduction (zoom) coefficient for the parts to be digitized.

The data processor element 25 advantageously includes software or computer program means enabling it to interact with at least a portion of the digitized document or the document to be digitized.

In particular, the data processor element 25 includes one or more computer programs linking the various modes of capture or interaction in the flat acquisition and/or display element or of activation of the illumination means of the flat display element 5 to emit specific digitization light upon activation of capture by the flat acquisition element 3.

Thus once the flat acquisition element 3 is positioned relative to a document 7 to be digitized, the computer program(s) execute(s) the steps of digitizing the document 7 by the flat acquisition element 3 and displaying the digitized document on the flat display element 5. Note that the digitization step can include emission of digitization light by the flat display element 5.

Moreover, the computer program(s) can implement the step of interaction with the digitized document or the document to be digitized via the flat interaction element 31.

Generally speaking, these computer programs provide shape recognition and carry out interactive processing of data from the flat acquisition element 3, the flat display element 5, and the flat interaction element 31.

In fact, the software means can include a perception level, an interface level, and a system level. Such software means can be produced using a software platform as described by Eric Clavier et al. in the document "A Cooperative Platform for Heterogeneous Document Interpretation According to User-Defined Scenarios" LNCS no. 3088 Springer Verlag (2003).

The perception level relates to control or management of the digitization of a document.

The interface level relates to display of data (the image and processing results) and perception of actions of a user, which include capture of manuscript information (writing, drawings, etc.) and capture of gestural commands (selection, triggering of processing, etc.).

The system level relates to an architecture for accommodating the various software components necessary for digitization control applications, segmentation and/or shape recognition tools and methods, and user action capture and/or recognition tools and methods.

The flat acquisition element 3, the flat display element 5, and the flat interaction element 31 are advantageously flexible. In fact, these elements can include organic components enabling all of them to operate effectively whilst being very flexible, thin and light. Thus all of these elements can be pressed against a document, fitting closely around any curvature thereof.

Figure 5:
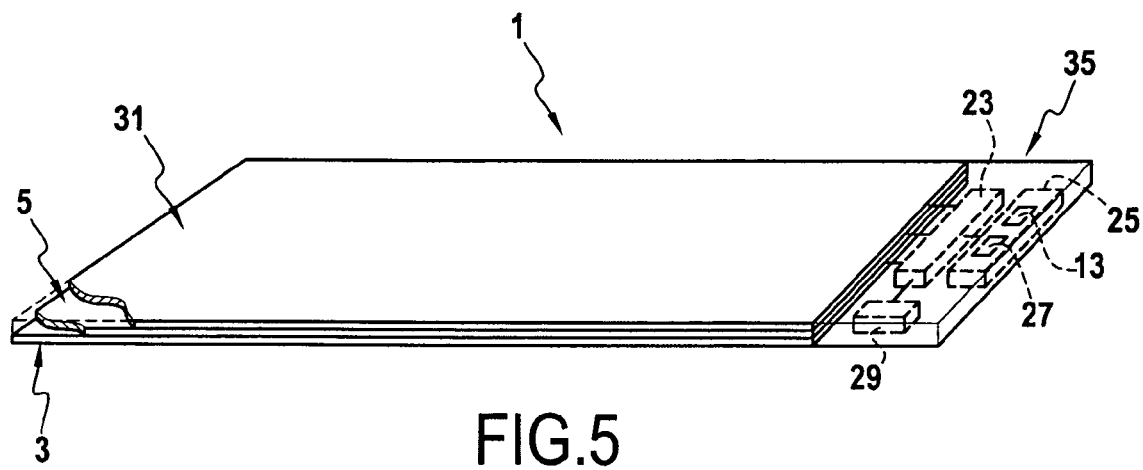
FIG. 5 is a diagrammatic view of a digital tracing device of the invention and including a flexible data processor element.

Moreover, FIG. 5 shows that the data processor element 25 can be a flexible element including a flexible memory 13 and a flexible central processor unit 27. In this case, the input-output port can also be flexible as well as the connection interface, where appropriate. Such flexible components using the TFTC technology are manufactured by the SEIKO EPSON CORPORATION company, for example.

In the embodiment shown in FIG. 5, the flexible data processor element 25 is mounted in a management area 35 at one end of the various flat flexible elements 3, 5, and 31 to produce a digital tracing device 1 that is thin all over.

Thus the digital tracing device 1 of the invention can include two types of software architecture according to the calculation power of the central unit 27 and the available memory 13.

In fact, in a first embodiment, the processing means 25 of the digital tracing device 1 can locally manage both display (text images and geometrical traces) and document recognition and analysis.

In a second embodiment, only display is managed locally by the processing means 25 of the digital display device 1. Document recognition and analysis software can be hosted on another terminal (personal digital assistant or PC) or take the form of services available via a telecommunications network. Access to and dialogue with the recognition software is effected via the connection interface 29.

Thus the digital tracing device 1 can be a flexible terminal dedicated to written communication that combines capture of manuscript information (data or commands) and display of digital documents.

Capture of manuscript information refers to capturing lines traced on the surface of the flexible flat transparent capture element 31 by means of the stylus. Moreover, the expression digital document refers to any presentation of information in the form of an array of points (image), vector descriptions (geometries with or without temporal information on the dynamic of the trace), and text.

To enable the required degree of interactivity, it may be necessary to switch from one presentation mode to another, as a function of the type of application. For example, with a digitized document in the form of an image, shape segmentation and classification tools and methods are used to extract or recognize characters or symbols present in the document image.

Figure 6:
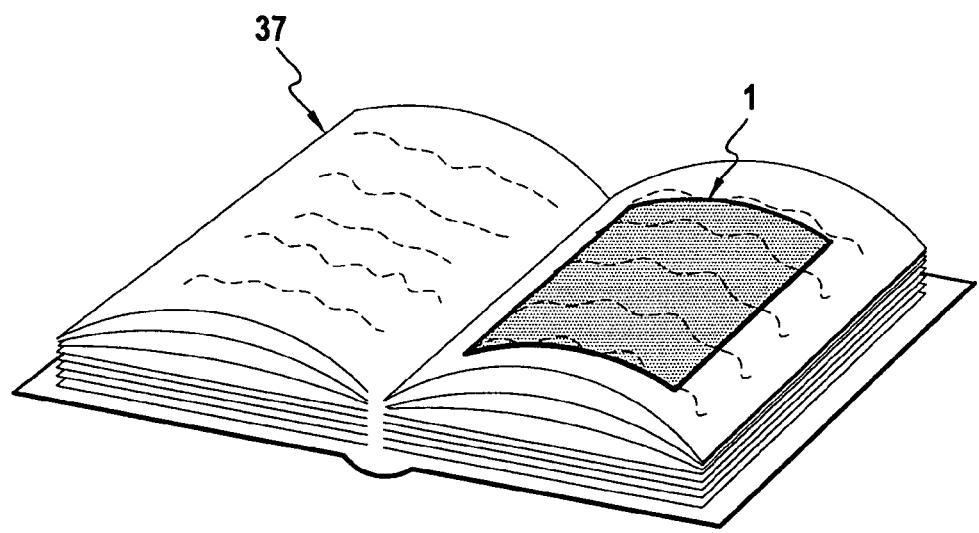
FIG. 6 is a diagrammatic view of a digital display device of the invention pressed against a page of a large book.

Thus the digital tracing device 1 produces a facsimile of the document 7 and enables comprehensive interactive processing of the document 7. Furthermore, FIG. 6 shows that the plasticity of the digital tracing device 1 enables documents (for example a page or part of a page of a large book 37) to be captured under highly varied conditions without encountering framing problems. This is because the digital tracing device 1 is pressed against the document, fitting closely around any curvature thereof.

Finally, this flexibility of the digital tracing device 1 enables packaging compatible with a mobile context. When not in use, the digital tracing device 1 can be stored in a compact form (rolled up or folded), and when it is in use, it can have a much larger display area than any portable terminal (personal digital assistant or mobile telephone).

The invention claimed is:

1. A digital tracing device comprising a flat acquisition element adapted to digitize a document and to produce a digitized document, a flat display element mounted on said flat acquisition element and adapted to display said digitized document, and a flat interaction element mounted on said flat display element and coupled to a data processor element, wherein the flat interaction element is configured to enable a user to interact with the flat acquisition element or the digitized document produced by the flat acquisition element.

2. The device according to claim 1, wherein said flat display element includes illumination means adapted to emit digitization light for activating digitization of said document by the flat acquisition element.

3. The device according to claim 1, wherein the data processor element is further coupled to said flat display element and said flat acquisition element.

4. The device according to claim 1, wherein said flat interaction element is transparent and covers at least a portion of said flat display element displaying the digitized document.

5. The device according to claim 1, wherein the data processor element is adapted to interact with at least a portion of the digitized document or a document to be digitized.

6. The device according to claim 1, wherein the flat acquisition element, the flat display element, and the flat interaction element are all flexible.

7. The device according to claim 1, wherein the data processor element is flexible.

8. The device according to claim 1, further comprising a connection interface enabling the digital tracing device to connect to an external terminal directly and/or via a telecommunications network.

9. A method of fabricating a digital tracing device comprising a flat acquisition element adapted to digitize a document and to produce a digitized document, a flat display element mounted on said flat acquisition element and adapted to display said digitized document, and a flat interaction element mounted on said flat display element and coupled to a data processor element, wherein the method comprises the steps of:

mounting the flat display element on the flat acquisition element;

mounting the flat interaction element on the flat display element; and coupling the flat interaction element with the data processor element, wherein the flat interaction element is configured to enable a user to interact with the flat acquisition element or the digitized document produced by the flat acquisition element.

10. A non-transitory computer readable medium storing a computer program implemented in a data processor element of a digital tracing device comprising a flat acquisition element adapted to digitize a document and to produce a digitized document, a flat display element mounted on said flat acquisition element and adapted to display said digitized document, and a flat interaction element mounted on said flat display element and coupled to a data processor element, said program including instructions which when executed by the data processor element perform the steps of:

digitizing a document by a flat acquisition element; and displaying the digitized document on a flat display element mounted on the flat acquisition element;

acquiring the actions of a user on the digitized document of the document to be digitized via the flat interaction element, wherein the flat interaction element is configured to enable a user to interact with the flat acquisition element or the digitized document produced by the flat acquisition element.

* * * * *